United States Patent
Uno et al.

(10) Patent No.: US 6,757,221 B1
(45) Date of Patent: Jun. 29, 2004

(54) OPTICAL HEAD HAVING OBJECT LENS AND PATTERNED COIL

(75) Inventors: Kazushi Uno, Kawasaki (JP); Shingo Hamaguchi, Kawasaki (JP); Kyoko Tadaki, Kawasaki (JP); Kiyoto Matsui, Kawasaki (JP); Goro Kawasaki, Kawasaki (JP); Nobuyuki Kanto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 772 days.

(21) Appl. No.: 09/625,654

(22) Filed: Jul. 26, 2000

(30) Foreign Application Priority Data

Aug. 25, 1999 (JP) .......................................... 11-237947

(51) Int. Cl.[7] .............................................. G11B 11/00
(52) U.S. Cl. ............................. 369/13.32; 369/13.23; 369/13.28
(58) Field of Search .......................... 369/13.28, 13.53, 369/13.13, 283, 13.39, 275.2, 13.17, 13.23, 13.33, 300, 44.15, 112.23, 118, 13.35, 13.32

(56) References Cited

U.S. PATENT DOCUMENTS

| | | | |
|---|---|---|---|
| 5,105,408 A | 4/1992 | Lee et al. ................. | 369/44.15 |
| 5,544,131 A | * 8/1996 | Albertini et al. .......... | 369/13.17 |
| 5,978,320 A | * 11/1999 | Nakaoki et al. ........... | 369/13.32 |
| 6,064,632 A | * 5/2000 | Nakaoki et al. ........... | 369/13.32 |
| 6,320,841 B1 | * 11/2001 | Watanabe et al. ........... | 369/300 |
| 6,407,884 B1 | * 6/2002 | Osborne et al. ........ | 360/114.01 |
| 6,618,330 B1 | * 9/2003 | Kawasaki et al. ........ | 369/13.23 |

FOREIGN PATENT DOCUMENTS

JP          218720       1/1990

* cited by examiner

*Primary Examiner*—Ali Neyzari
(74) *Attorney, Agent, or Firm*—Greer, Burns & Crain, Ltd.

(57) ABSTRACT

An optical head includes a lens carrier movable at least radially of a magneto-optical disk in facing relation thereto. An object lens is mounted on the lens carrier to converge a laser beam for forming a laser spot on the disk. The object lens has an optical axis and includes a lens surface directed toward the disk. A patterned coil is formed on the lens surface at least in one layer and has a light-passing opening corresponding to the optical axis of the object lens. A light-pervious layer is formed on the lens surface for closing the light-passing opening of the coil.

36 Claims, 16 Drawing Sheets

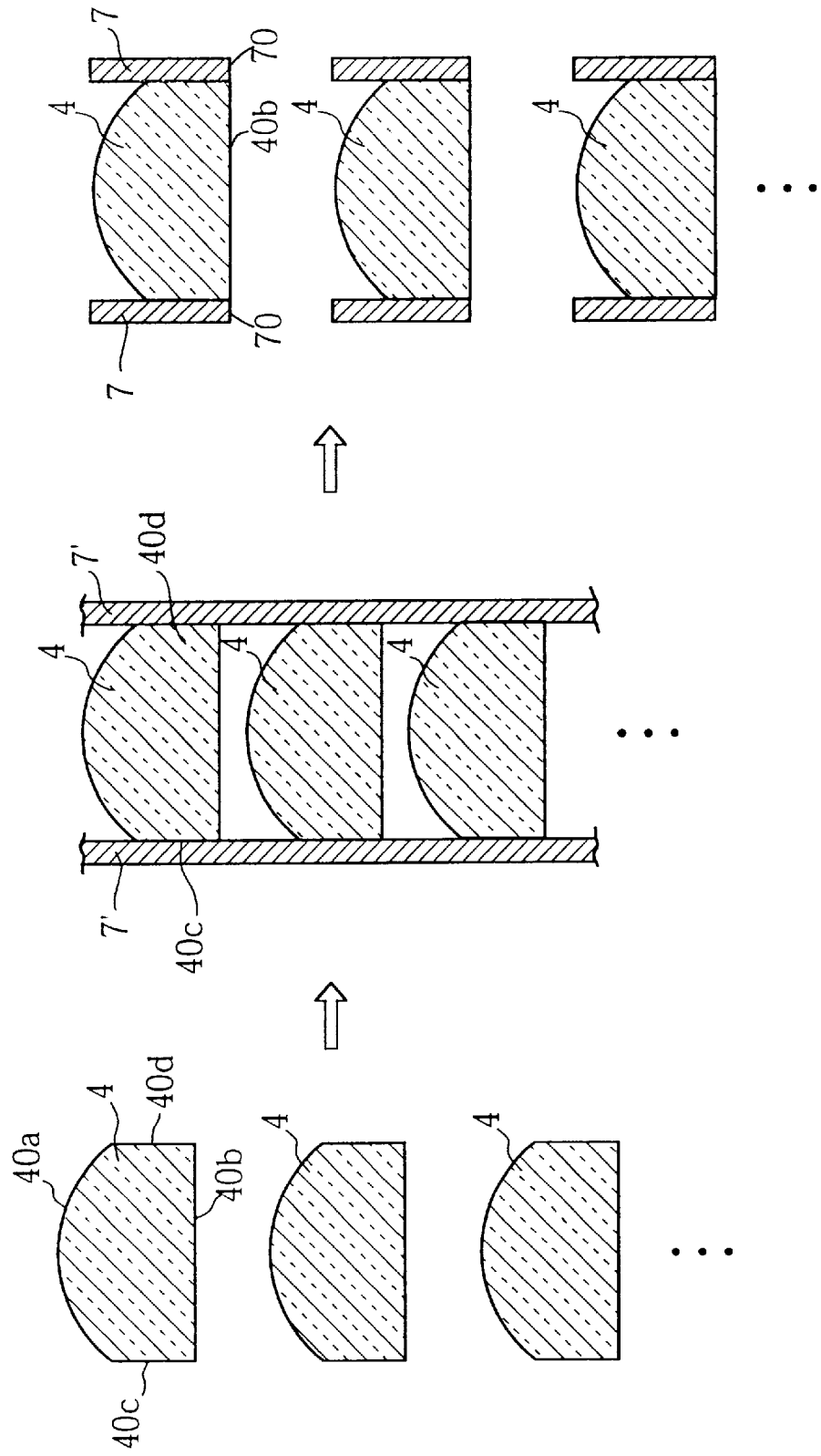

OPTICAL HEAD HAVING OBJECT LENS AND PATTERNED COIL

BACKGROUND OF THE INVENTION

1. Field of the Invention

The present invention relates to an optical head for writing data to and reading data from a magneto-optical disk.

2. Description of the Related Art

A conventional optical head of this kind is disclosed, for example, in JP-A-02(1990)-18720. For clarity, reference is now made to FIGS. 19 and 20 of the present application to describe the optical head disclosed in this publication.

As shown in FIG. 19, the prior art optical head includes a mirror M and a slider S. The mirror M is directly supported on a tip end of a main arm A, whereas the slider S is indirectly supported on the tip end of the main arm A via a suspension arm Sa. The main arm A is movable back and forth radially of a magneto-optical disk D which rotates at a high speed on a spindle (not shown). The slider S carries an object lens L and a coil block Cb. The coil block Cb has a considerable thickness and is formed with a tapered hole TH concentric with an optical axis of the object lens L. The underside of the coil block Cb is provided with a coil C surrounding the tapered hole TH.

The optical head having such a structure is referred to as a front-illumination-type head because it directly faces the recording layer of the magneto-optical disk D. In operation, when a laser beam advancing horizontally is reflected by the mirror M for entering the object lens L which then causes the laser beam to converge, thereby forming a laser spot Ls on the recording layer of the disk D. The coil C generates an external magnetic field needed for writing data from and reading data onto the recording layer of the disk D at the laser spot Ls. In this optical head, since the slider S itself is provided with the coil C, there is no need to separately provide a magnetic head for generation of an external magnetic field, so that it is possible to reduce the apparatus size. Further, since the coil C is positioned the disk D, it is capable of efficiently generating an external magnetic field for application to the recording layer of the disk.

However, the prior art optical head still has problems to be solved, as described below.

Referring to FIG. 20, the laser beam proceeds at an angle i within the object lens L but goes out from the lower lens surface 90 into an air space at a larger angle r before reaching the magneto-optical disk D. This is because air has the smallest refractive index among various media including a glass material of which the object lens L is made. The angle α of incidence of the laser beam onto the disk D (the converging angle being 2α) is equal to the outgoing angle r.

According to the prior art described above, the tapered hole TH of the coil block Cb is an unoccupied space. Therefore, even if the coil C is positioned close to the magneto-optical disk D to the extent of virtually contacting it, the thickness or height S2 of the air layer between the lens surface 90 and the disk D is no less than the combined thickness of the coil block Cb and the coil C. As a result, the laser beam path from the lens surface 90 to the disk D becomes inevitably long.

On the other hand, an attempt is made in recent years to increase the NA (numerical aperture) of an object lens for realizing a higher-density recording of data onto a magneto-optical disk. For realizing an NA increase in the above-described optical head (namely for increasing the outgoing angle r in FIG. 20), it is necessary to diametrically increasing the coil block Cb and the tapered hole TH or to reduce the combined thickness of the coil block Cb and the coil, in addition to diametrically increasing the object lens L itself. However, the size increase of the object lens L and the coil block Cb is impractical because it will result in a weight increase which hinders high-speed access by the optical head, besides difficulty of efficiently generating a magnetic field at the laser spot Ls. Further, a decrease of the thickness of the coil block Cb leads to difficulty in the realization of machining and assembling precision. Moreover, since the travel path of the laser beam in the air gap after exiting from the object lens is long, it is difficult to perform focusing adjustment due to the need for strictly defining this long path. Conventionally, all these have been factors that have hindered high-density recording of data onto the magneto-optical disk.

SUMMARY OF THE INVENTION

It is, therefore, an object of the present invention to provide an optical head which is capable of reducing machining and/or assembling difficulties for facilitating laser beam focusing while realizing an NA increase of the object lens with effective generation of a magnetic field.

According to a first aspect of the present invention, an optical head comprises a lens carrier movable at least radially of a magneto-optical disk in facing relation thereto. An object lens is mounted on the lens carrier to converge a laser beam for forming a laser spot on the disk. The object lens has an optical axis and includes a lens surface directed toward the disk. A patterned coil is formed on the lens surface at least in one layer. The coil has a light-passing opening corresponding to the optical axis of the object lens. A light-pervious layer is formed on the lens surface for closing the light-passing opening of the coil.

Preferably, the light-pervious layer may be equal or substantially equal in refractive index to the object lens.

Preferably, the light-pervious layer may entirely cover the coil.

In one embodiment of the first aspect of the present invention, the object lens has an opposite pair of side surfaces each of which is provided with an electrode in electrical connection to the coil. The electrode may have an end surface flush with the lens surface, and the coil may extend onto the end surface of the electrode in electrical contact therewith. Alternatively, the electrode may be in the form of a conductor film extending from a respective one of the side surfaces of the object lens to the lens surface into electrical contact with the coil.

In another embodiment of the first aspect of the present invention, the object lens has a side surface which is provided with a pair of electrodes in electrical connection to the coil.

In a further embodiment of the first aspect of the present invention, the lens carrier has a surface flush with the lens surface, and the light-pervious layer extends onto said surface of the lens carrier. In this case, the lens carrier may be provided with a pair of electrodes each extending onto said surface of the lens carrier for electrical contact with the coil.

Preferably, the optical head may further comprises an additional object lens mounted on the lens carrier at a side away from the disk.

Preferably, the lens carrier may be in the form of a slider elastically supported to float slightly from the disk in rotation.

According to a second aspect of the present invention, there is provided an optical head comprising a lens carrier movable at least radially of a magneto-optical disk in facing relation thereto. An object lens is mounted on the lens carrier to converge a laser beam for forming a laser spot on the disk. The object lens has an optical axis and includes a lens surface directed toward the disk. A light-pervious substrate includes a first surface bonded to the lens surface, and a second surface directed toward the disk. A patterned coil is formed on the second surface of the substrate at least in one layer. The coil has a light-passing opening corresponding to the optical axis of the object lens. A light-pervious layer is formed on the second surface of the substrate for closing the light-passing opening of the coil.

Preferably, the substrate and the light-pervious layer may be equal or substantially equal in refractive index to the object lens.

Preferably, the light-pervious layer may entirely cover the coil.

In one embodiment of the second aspect of the present invention, the substrate is provided with a pair of electrodes in electrical connection to the coil. Preferably, each of the electrodes may have an end surface flush with the second surface of the substrate, and the coil may extend onto the end surface of the electrode in electrical contact therewith. Further, each of the electrodes may penetrate through the substrate. Alternatively, each of the electrodes may comprise a conductor film extending from a side edge of the substrate to the second surface thereof into electrical contact with the coil.

Preferably, the optical head may further comprise an additional object lens mounted on the lens carrier at a side away from the disk.

Preferably, the lens carrier may be in the form of a slider elastically supported to float slightly from the disk in rotation.

According to a third aspect of the present invention, there is provided an optical head comprising a lens carrier movable at least radially of a magneto-optical disk in facing relation thereto. The lens carrier includes a support wall having a surface directed toward the disk. The support wall is formed with a light-passing hole. An object lens is mounted on the support wall of the lens carrier inside thereof to converge a laser beam for forming a laser spot on the disk. The object lens has an optical axis in alignment with the light-passing hole of the support wall. A patterned coil is formed on said surface of the support wall at least in one layer. The coil has a light-passing opening corresponding to the optical axis of the object lens. A light-pervious layer is formed on said surface of the support wall for closing the light-passing hole of the support wall and the light-passing opening of the coil.

Preferably, the light-pervious layer may be equal or substantially equal in refractive index to the object lens.

Preferably, the light-pervious layer may entirely cover the coil.

In one embodiment of the third aspect of the present invention, the lens carrier is provided with a pair of electrodes in electrical connection to the coil. Preferably, each of electrodes may penetrate through the lens carrier.

Preferably, the optical head may further comprise an additional object lens mounted on the lens carrier at a side away from the disk.

Preferably, the lens carrier may be in the form of a slider elastically supported to float slightly from the disk in rotation.

These and other objects, features, and advantages of the present invention will become more apparent from the following detailed description of the present invention given with the accompanying drawings.

BRIEF DESCRIPTION OF THE DRAWINGS

In the accompanying drawings:

FIGS. 5a to 5c are sectional views showing successive process steps of producing object lenses;

DETAILED DESCRIPTION OF THE INVENTION

Hereafter, preferred embodiments of the present invention will be specifically described with reference to the accompanying drawings.

FIGS. 1 through 4 illustrate a magneto-optical recording/reproducing apparatus according to a first embodiment of the present invention.

Figure 1:
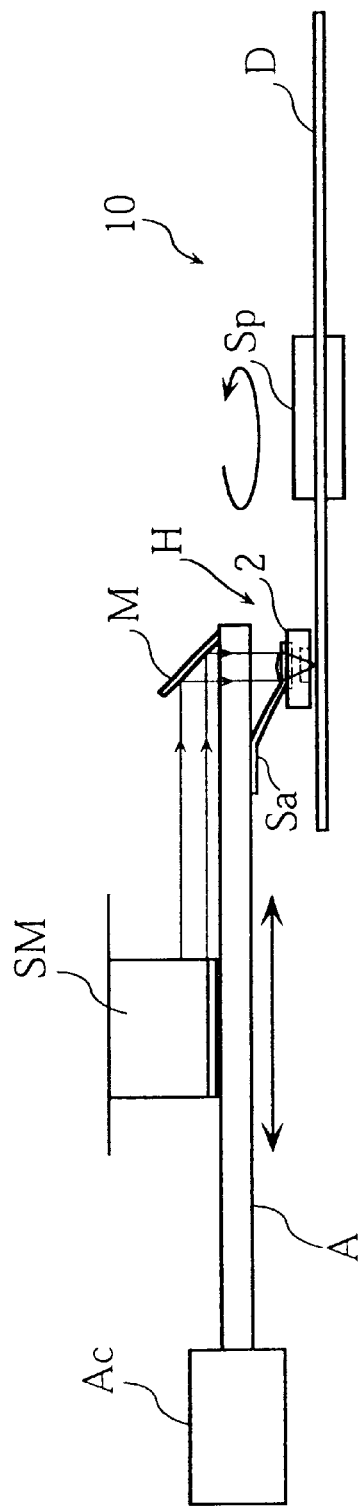
FIG. 1 is an overall view showing an example of a magneto-optical recording/reproducing apparatus to which the present invention is applied.

Referring first to FIG. 1, the magneto-optical recording/reproducing apparatus generally represented by reference numeral 10 writes and reads data relative to a magneto-optical disk D rotating at high speed on a spindle Sp. In this embodiment, a recording layer of the disk D is located on the upper surface of the disk D. An optical head H includes a slider 2 supported at a tip end of a main arm A via a suspension arm Sa. The arm A is linearly movable back and forth to move the slider 2 radially of the disk D in facing relation to the recording layer of the disk D. The arm A may be moved by a linear actuator Ac such as a linear voice coil motor. Further, a mirror M is also disposed at the tip end of the arm A, and a laser beam is radiated onto the mirror M from a fixed module SM. The module SM incorporates a laser generator, a detector, a collimator, etc.

The slider 2, as an example of a movable lens carrier, may be a resin-molded block for example. The slider 2 is supported by the suspension arm Sa so as to be in contact with the recording surface of the magneto-optical disk D when the disk D stops rotating. However, the slider 2 floats up slightly from the recording surface of the disk D by a pressure rise due to a fluid wedge formed between the slider 2 and the disk D when the disk D is rotating at high speed. As is clearly shown in FIG. 2, the slider 2 includes a first object lens 3, a second object lens 4, a coil 5, a light-pervious layer 6, and a pair of electrodes 7.

The first object lens 3 is provided for achieving a higher numerical aperture NA of the optical system of the optical head H than is obtainable with the second object lens 4 alone. If a plurality of object lenses are used, it is easier to increase the numerical aperture of the optical system of the optical head H, whereby the recording density of the magneto-optical disk D can be increased. The first object lens 3 is disposed right under the mirror M by being inserted into a recess 21 in the upper surface of the slider 2 for example. The laser beam output from the fixed module SM and reflected by the mirror M is incident into the first object lens 3 and, after being converged to some extent by the first object lens 3, proceeds towards the second object lens 4. The suspension arm Sa supports the slider 2 in such a manner as to circumvent the first object lens 3.

The second object lens 4 forms a laser spot Ls on the recording layer of the magneto-optical disk D by further converging the laser beam that has passed through the first object lens 3. The second object lens 4 is mounted right under the first object lens 3 by being inserted into a hole 22 of the slider 2 for example. The second object lens 4 has a spherically convex upper surface 40a and a planer lower surface 40b.

The pair of electrodes 7 are formed, for example, of a metal plate such as a copper plate having good electrical conductivity. The pair of electrodes 7 extend in the thickness direction (i.e., in parallel to the optical axis Oa) of the second object lens 4 and are bonded to the planer side surfaces 40c, 40d thereof. As is clearly depicted in FIG. 3, the lower end surface 70 of each electrode 7 is substantially flush with the lower surface 40b of the second object lens 4.

The coil 5 is formed by patterning a thin conductor film on the lower surface 40b of the second object lens 4 and the lower end surface 70 of each electrode 7. Such patterning of the conductor is carried out by first forming a metal layer through sputtering or vapor deposition and then etching unnecessary portions through photolithography. Therefore, the coil 5 may be made to have an extremely small thickness of about several $\mu$m to several tens of $\mu$m. As is clearly depicted in FIG. 4, the coil 5 includes a plurality of substantially concentric coil streaks 50 centered about the optical axis Oa of the second object lens 4 and connected parallelly to two lead wirings 51. The coil 5 is centrally hollow to provide a light-passing opening 55 corresponding to the optical axis Oa.

Figure 3:
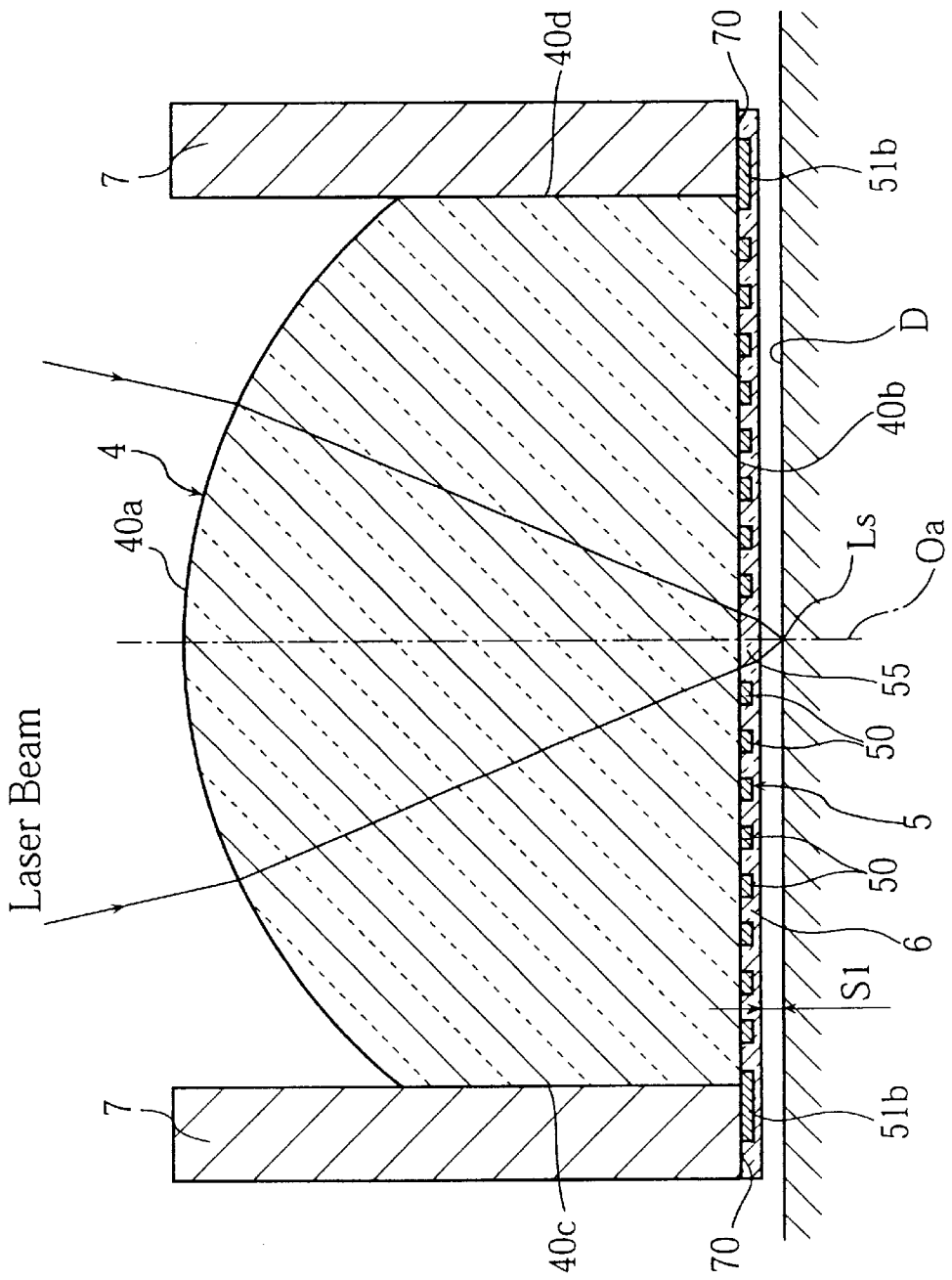
FIG. 3 is a further enlarged sectional view illustrating an essential part of the optical head shown in FIG. 2.

As will be understood from FIG. 3, the laser beam incident into the second object lens 4 is converged to have a considerably small diameter near the lens surface 40b. Since the coil 5 itself is extremely thin as described before, the light-passing opening 55 of the coil 5 can also be made diametrically small. This is advantageous for increasing the intensity of the magnetic field generated by the coil 5 near the laser spot Ls.

Figure 4:
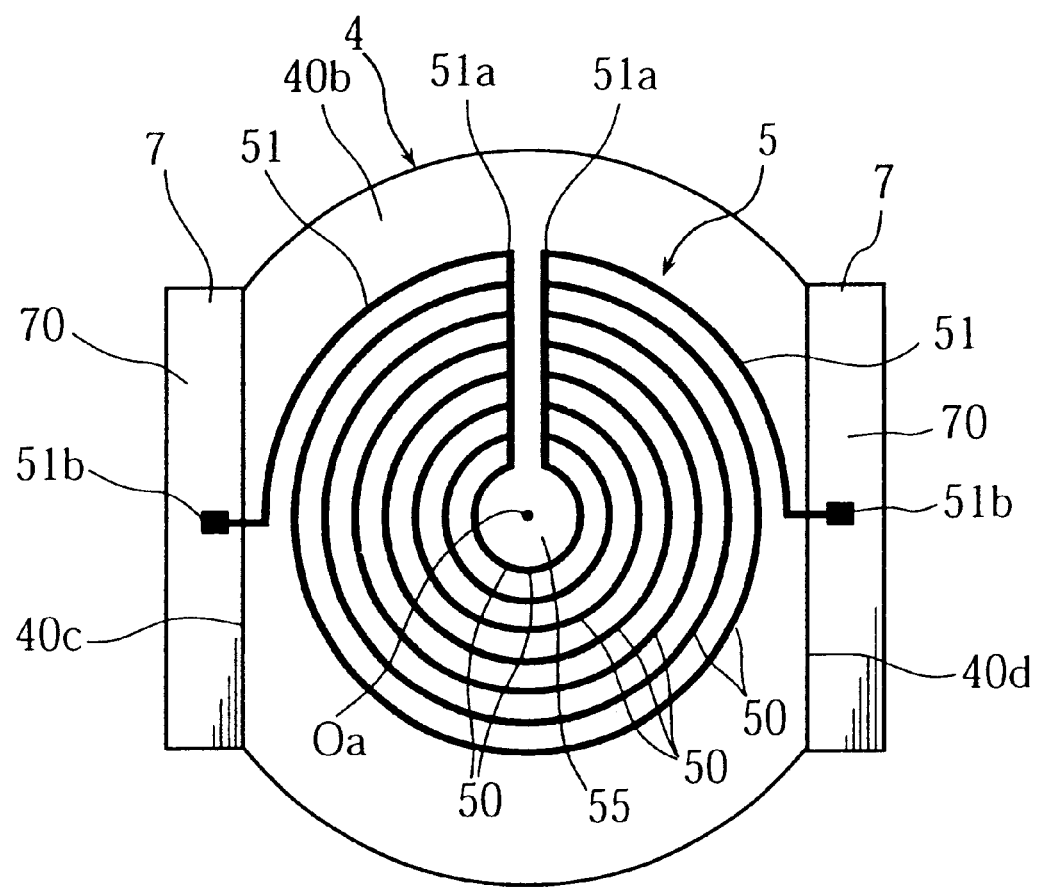
FIG. 4 is a bottom view illustrating a coil of the optical head shown in FIGS. 2 and 3.

As illustrated in FIG. 4, each lead wiring 51 is bent circumferentially of the coil 5 at an intermediate position 51a and terminates at an end 51b which overlaps the lower end surface 70 of a respective electrode 7 to be in electrical contact therewith. Therefore, electric power can be supplied to the coil 5 through the pair of electrodes 7 for generating a magnetic field.

Figure 2:
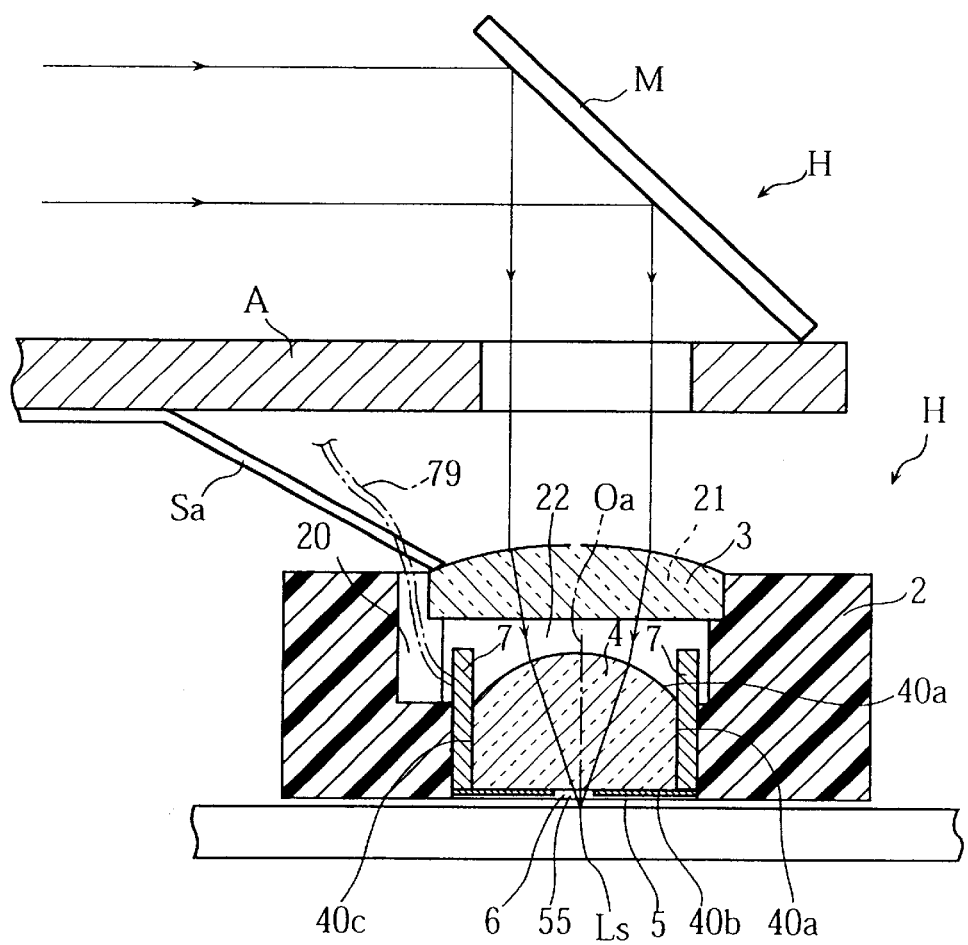
FIG. 2 is an enlarged sectional view showing an optical head according to a first embodiment of the present invention.

As is clearly depicted in FIG. 2, the slider 2 may be provided with a cutout 20 for guiding wirings 79 into connection with the pair of electrodes 7. In this way, electric power can be supplied to the coil 5 from above the slider 2.

The light-pervious layer 6 is a thin film made, for example, of transparent glass or the like which is equivalent or substantially equivalent in refractive index to the second object lens 4. The light-pervious layer 6 may be formed by sputtering or otherwise depositing a glass material over the lens surface 40b and the lower end surface 70 of each electrode 7 so as to cover the entire coil 5. This allows the light-passing opening 55 of the coil 5 to be closed by the light-pervious layer 6.

The second object lens 4 provided with the pair of electrodes 7, the coil 5, and the light-pervious layer 6 may be produced in the following manner.

First, as shown in FIG. 5a, a plurality of second object lenses 4 are prepared. Each of the second object lenses 4 may be produced by cutting a glass sphere for example.

Then, as shown in FIG. 5b, the plurality of second object lenses 4 are arranged in an array, and relatively long plates 7' of an electrically conductive material are bonded to the respective side surfaces 40c, 40d of the array of second object lenses 4. Each of the plates 7' provides an electrode 7 when later cut.

Then, as shown in FIG. 5c, each of the electrically conductive plates 7' is cut into an electrode 7 of a suitable length. After such cutting, the lower end surface 70 of the electrode 7 and the corresponding second object lens 4 may be subjected to final polishing if needed.

After the plurality of second object lenses 4 including the electrodes 7 are produced in this manner, a coil 5 is formed on each second object lenses 4 and the electrodes 7 by patterning a thin conductor film using a combination of vapor deposition or sputtering and photolithography for example. At this time, the lower end surface 70 of each electrode 7 can be brought into ohmic contact with the coil 5 by forming an end 51b of a respective lead 51 of the coil 5 directly on the lower end surface 70 of the electrode 7.

Finally, a light-pervious layer 6 is formed over the coil 5 by sputtering transparent glass into a thin film for example.

The above-described formation of the coil 5 and the light-pervious layer 6 may be readily performed with existing equipment generally used for manufacturing semiconductor devices. Thus, it is unnecessary to separately provide additional equipment.

The optical head H described above operates in the following manner.

At the time of data writing or data reproducing relative to the magneto-optical disk D, the slider 2 floats above the disk D rotating at a high speed due to a pressure function resulting from a fluid wedge, as shown in FIG. 3. At this time, the gap S1 between the disk D and the light-pervious layer 6 lies in the $\mu$m or sub-$\mu$m order for example. As described before, electric power may be supplied to the coil 5 from behind (from above) the slider 2 via the wirings 79 connected to the pair of electrodes 7, so it is not necessary to provide bulky wirings (e.g. gold wirings) on the light-pervious layer 6 or the coil 5. This allows the gap S1 between the light-pervious layer 6 and the disk D to be extremely small. As a result, the coil 5 can be positioned close to the laser spot Ls on the disk D, thereby increasing the intensity of the magnetic field acting on the laser spot.

Figure 6B:
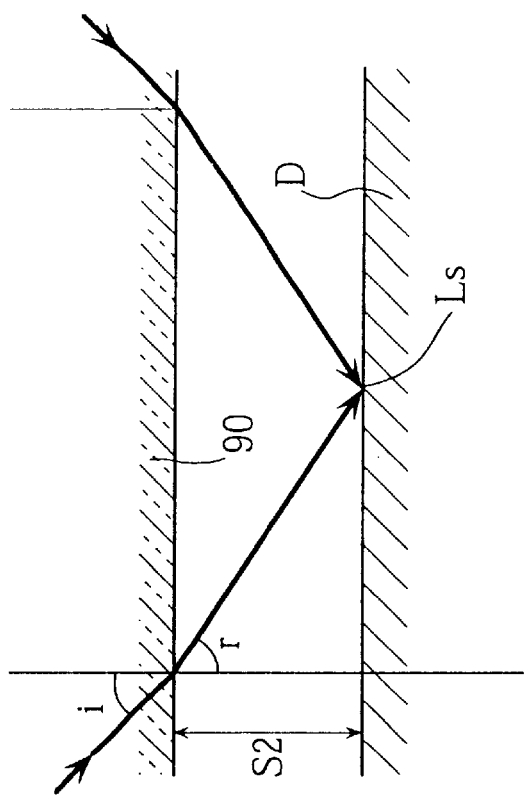
FIGS. 6a and 6b are views illustrating laser beam focusing in the optical head of the present invention and in a prior art optical head, respectively.
Figure 6A:
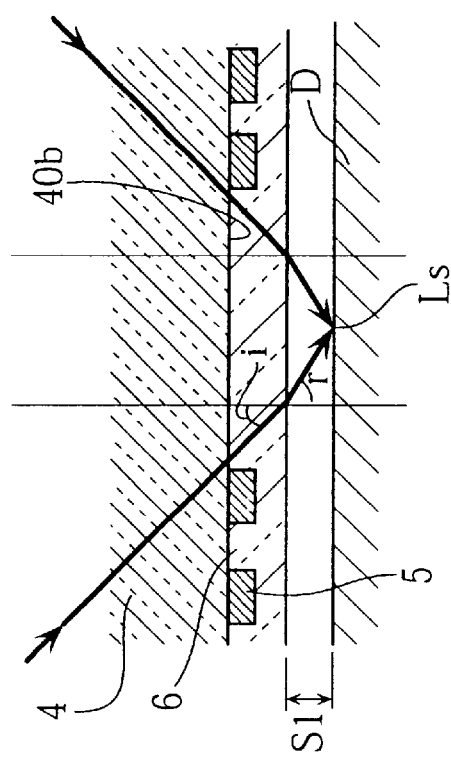

The laser beam passing through the first object lens 3 and the second object lens 4 advances toward the magneto-optical disk D after passing through the light-passing opening 55 of the coil 5 covered by the light-pervious layer 6. Since the light-pervious layer 6 is made of a material having the same or substantially the same refractive index as the second object lens 4, the laser beam is not refracted in proceeding from the lens surface 40b of the second object lens 4 into the light-pervious layer 6. In other words, the laser beam passes through the second object lens 4 and the light-pervious layer 6 at substantially the same angle i, as shown in FIG. 6a. Thus, the lower surface of the light-pervious layer 6 may be virtually regarded as a beam exit surface of the second object lens 4 itself. When the laser beam exits from the light-pervious layer 6 to impinge on the disk D through the air gap or layer having a greatly different refractive index, it is refracted to an angle r, as also illustrated in FIG. 6a. The height S1 of the air gap is very small because it depends only on the fluid wedge which causes the slider 2 to float. As a result, laser beam focusing of the second object lens 4 can be easily performed by considering the small height S1 of the air gap alone which lies in the $\mu$m or sub-$\mu$m order.

Figure 19:
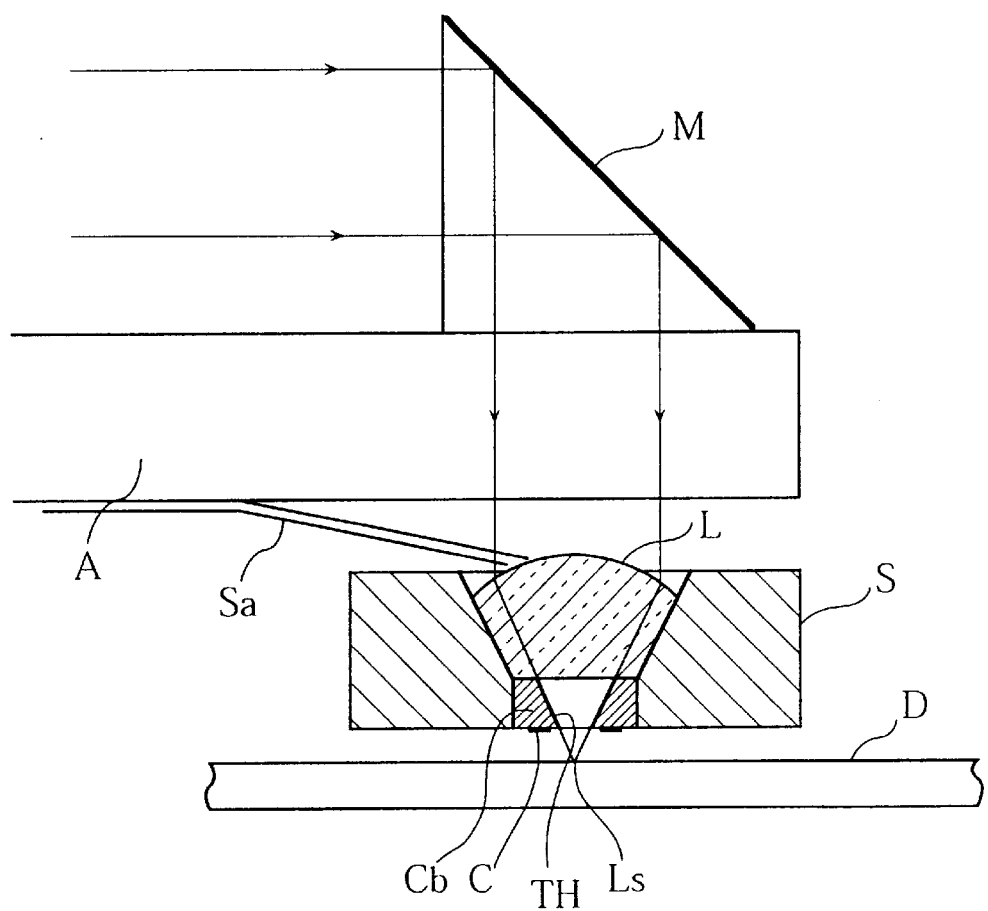
FIG. 19 is a sectional view showing an essential part of a conventional optical head.
Figure 20:
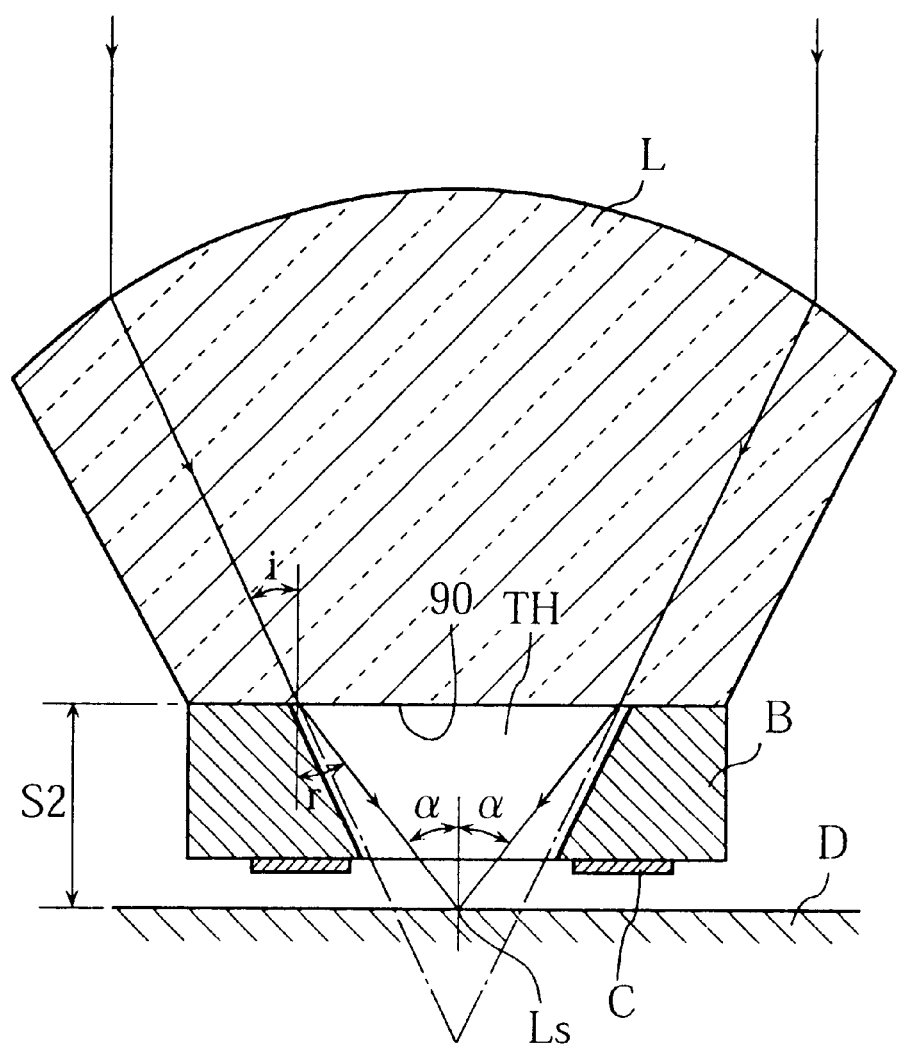
FIG. 20 is a sectional view illustrating the operation of the optical head shown in FIG. 19.

According to the prior art shown in FIGS. 19 and 20, by contrast, the lower lens surface 90 of the object lens L is spaced from the disk D by a distance S2 (see also FIG. 6b) which is equivalent to the thickness of the coil block Cb plus the floating height (S1 in FIG. 6a) of the coil block Cb. Thus, the spacing S2 or the length of the laser beam path from the object lens 90 to the disk D is much greater than the floating height S1 alone. As a result, it is necessary to perform laser beam focusing of the object lens 90 considering both the thickness of the coil block Cb and the floating height S1, thereby making such focusing more difficult while requiring a larger aperture size.

Figure 7:
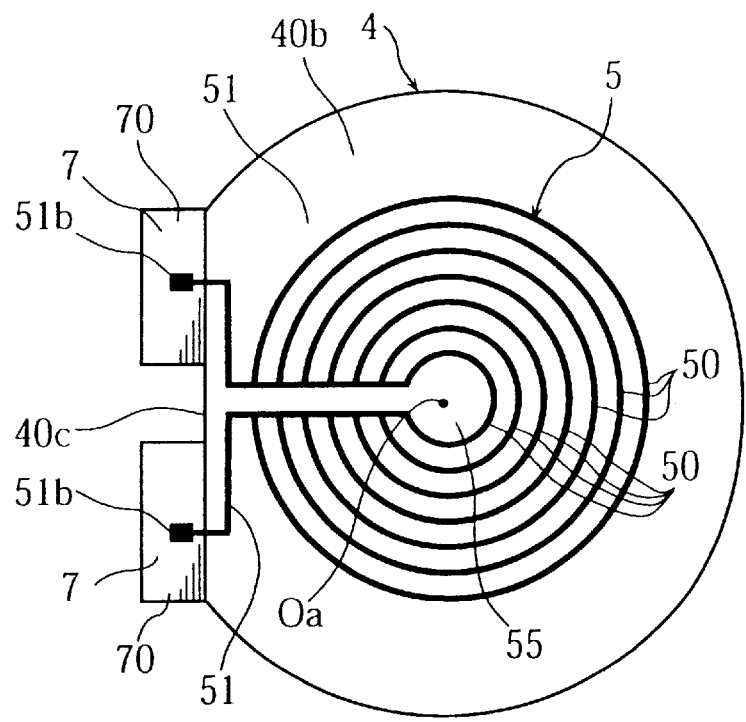
FIG. 7 is a bottom view showing an optical head according to a second embodiment of the present invention.

FIGS. 7 to 11 show other embodiments of the present invention. In FIG. 7 and any subsequent figures, elements identical or similar to those of the previous embodiment are designated by the same reference numerals as in the previous embodiment.

In a second embodiment shown in FIG. 7, a pair of electrodes 7 to which a coil 5 is electrically connected are disposed side by side in contact with a same side surface 40c of a second object lens 4. According to such a structure, the paired electrodes 7 are close to each other, so that it is easier to connect the paired electrodes 7 to external wirings (not shown in FIG. 7). Further, compared with the embodiment shown in FIGS. 1 to 4, two lead wirings 51 of the coil 5 can be made shorter, and the overall shape of the coil 5 becomes simpler.

Figure 8:
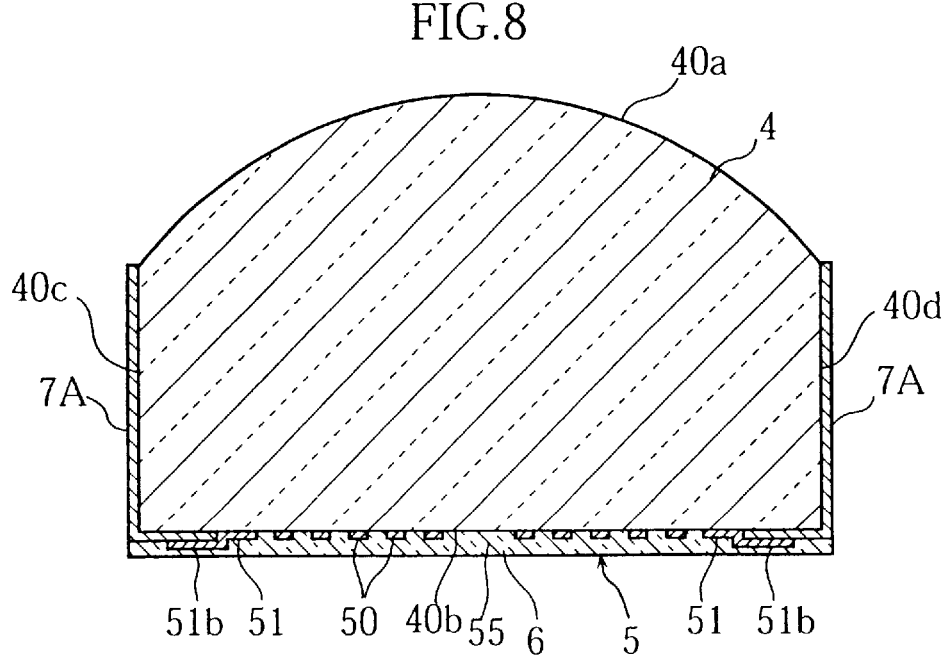
FIG. 8 is a sectional view showing an optical head according to a third embodiment of the present invention.

In a third embodiment shown in FIG. 8, two film electrodes 7A are formed to extend from a lower surface 40b of a second object lens 4 onto two opposite side surfaces 40c, 40d, respectively. The film electrodes 7A may be formed by sputtering a metal material into a thin film which is later patterned by etching. A coil 5 includes a leading wiring 51 which has an end 51b formed over a respective one of the film electrodes 7A in ohmic contact therewith.

According to the third embodiment shown of FIG. 8, electric power can be supplied to the coil 5 via the two film electrodes 7A which circumvent the lower lens surface 40b of the second object lens 4, and the light-pervious layer 6 can be suitably positioned near the magneto-optical disk (not shown), like the foregoing embodiment shown in FIGS. 1–4. In this way, the specific design of the electrodes used for supplying electric power to the coil 5 may be optionally modified in various ways. For instance, the lower lens surface 40b of the second object lens 4 may be formed with a pair of electrode pads which are electrically connected, via through-holes, to another pair of electrode pads formed on other surfaces of the second object lens 4.

Figure 9:
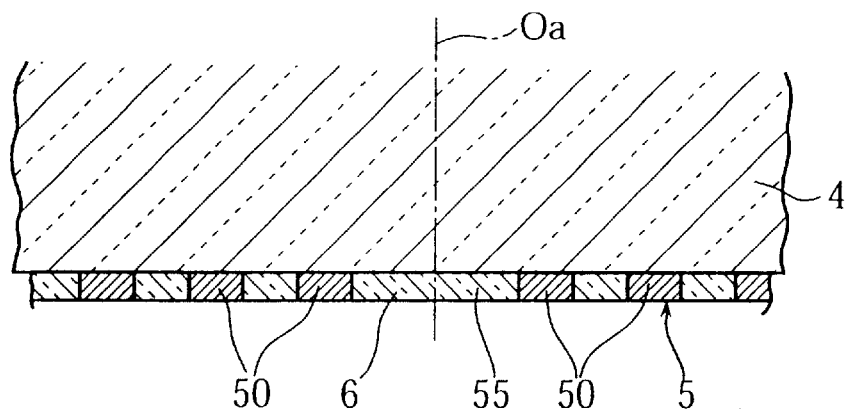
FIG. 9 is a fragmentary sectional view showing an optical head according to a fourth embodiment of the present invention.

In a fourth embodiment shown in FIG. 9, a light-pervious layer 6 is formed to have a lower surface which is flush with a lower surface of a coil 5. According to such a structure, the coil 5 and the light-pervious layer 6 are equally spaced from a magneto-optical disk (not shown), so that the coil 5 can be located maximally close to the disk to generate a stronger magnetic field at a lower power consumption.

In this way, the light-pervious layer 6 need not cover the entire coil 5 as long as it closes the light-passing opening 55 of the coil 5. In other words, the light-pervious layer 6 may be formed only to close the light-passing opening 55 of the coil 5. Further, the light-pervious layer 6 may be formed only to cover a part of the light-passing opening 55 of the coil 5 where the laser beam passes. However, for purposes of protecting the coil 5, it is more advantageous if the light-pervious layer 6 entirely covers the coil 5 or fills the spaces between the coil steaks 55.

Figure 10:
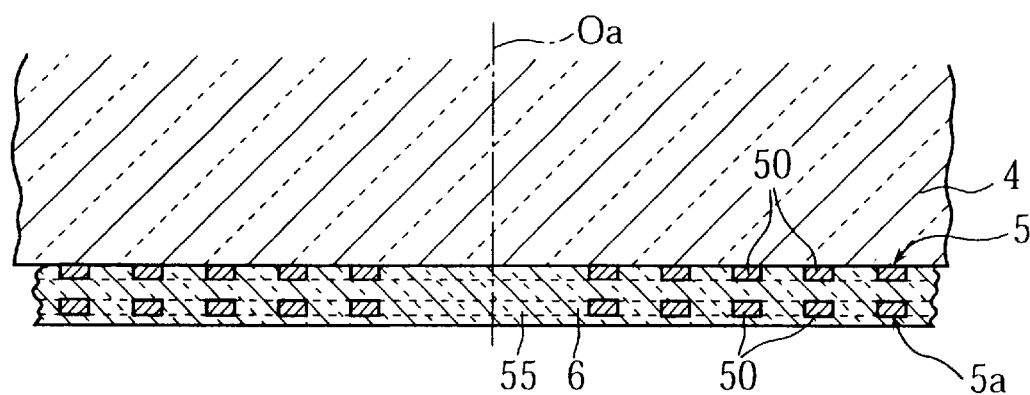
FIG. 10 is a fragmentary sectional view showing an optical head according to a fifth embodiment of the present invention.

In a fifth embodiment shown in FIG. 10, coils 5, 5a are provided in two layers. Such a structure is advantageous for generating a strong magnetic field. Alternatively, three or more coils may be provided in layers for generating an even stronger magnetic field.

Figure 11:
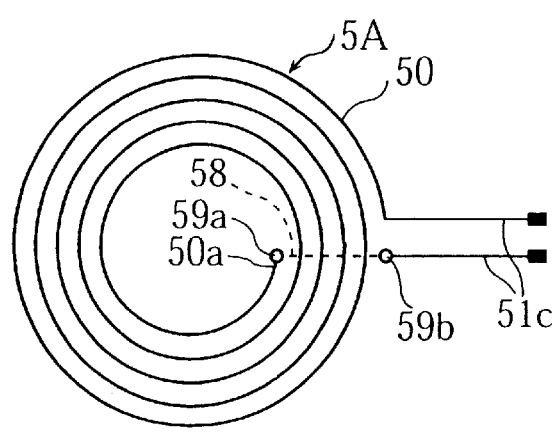
FIG. 11 is a schematic plan view showing a coil pattern in an optical head according to a sixth embodiment of the present invention.

In a sixth embodiment shown in FIG. 11, a coil 5A is formed in a spiral pattern. The coil 5A has one end 50a located within the spiral and electrically connected, via through-holes 59a, 59b and an intermediate wiring 58, to a lead wiring 51c formed outside the spiral. The intermediate wiring 58 may be formed on an insulating underlayer. The other end of the coil 5A positioned outside the spiral is connected to another lead wiring 51c extending in parallel to the first-mentioned lead wiring. In this way, the coil is not limited in its specific configuration but may be helically or otherwise shaped.

Figure 12:
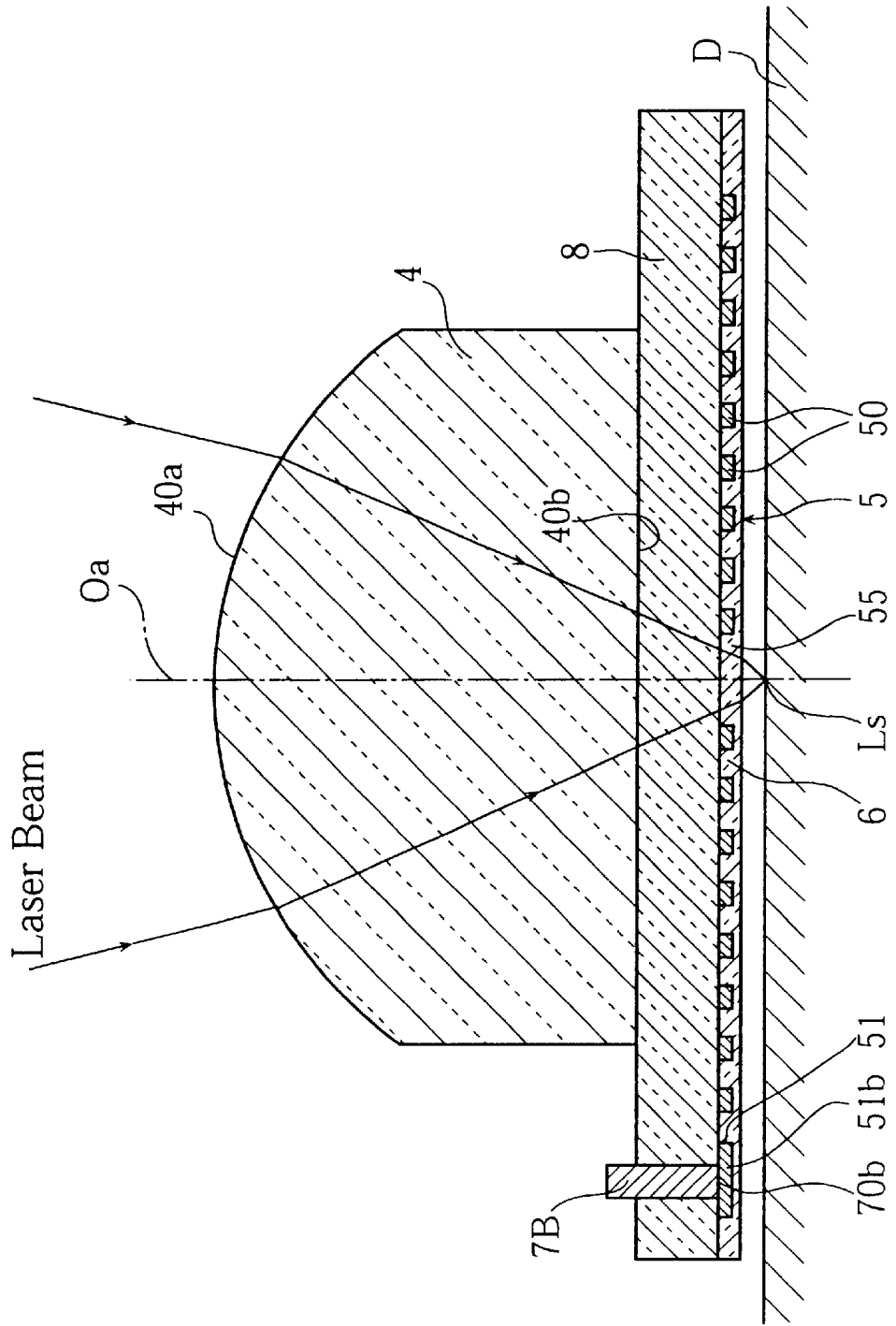
FIG. 12 is a sectional view showing an optical head according to a seventh embodiment of the present invention.
Figure 13:
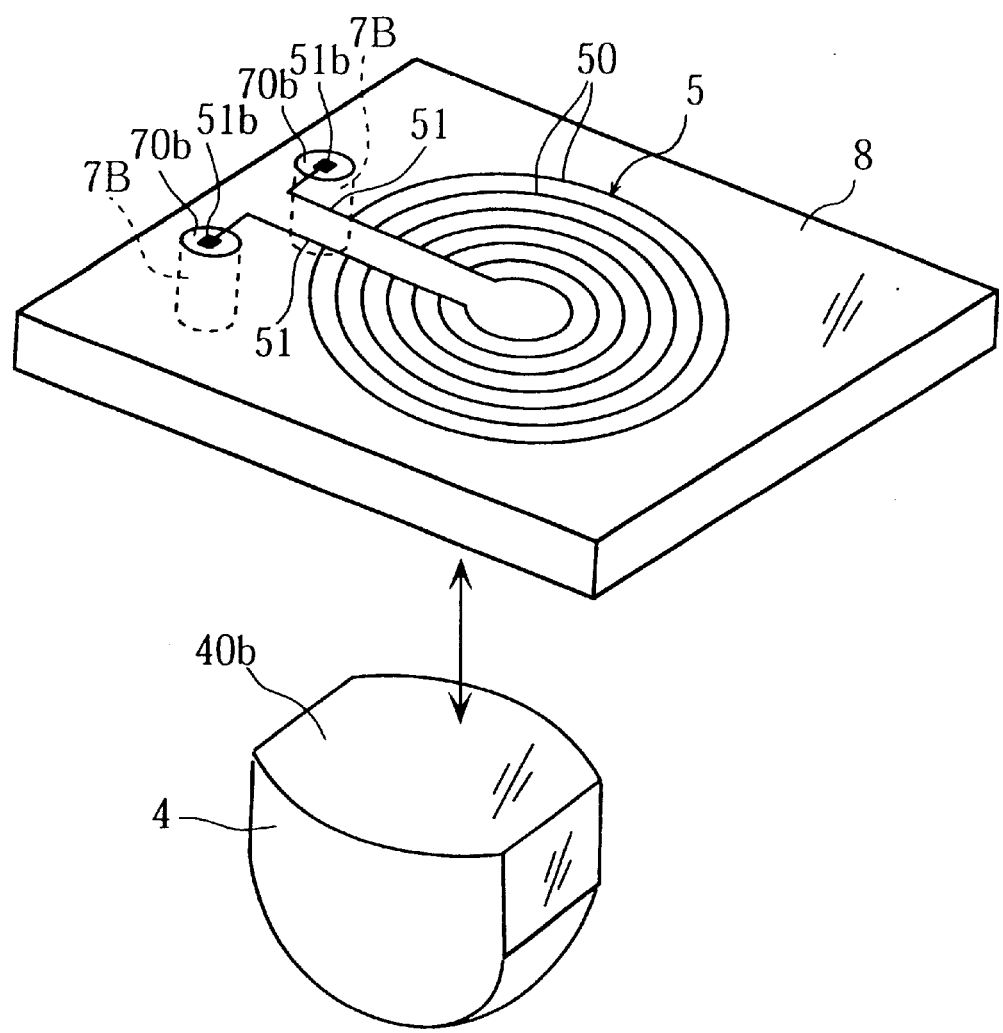
FIG. 13 is a perspective view showing the optical head of FIG. 12 in an exploded and inverted state.

FIGS. 12 and 13 illustrate a magneto-optical recording/reproducing apparatus according to a seventh embodiment of the present invention. In this embodiment, a coil 5 and a light-pervious layer 6 are not provided directly on a second object lens 4. Instead, the coil 5 and the light-pervious layer 6 are formed on the lower surface of a substrate 8 which in turn is attached the lower lens surface 40b of the second object lens 4. The coil 5 may be formed by patterning a thin metal film, so that the thickness of the coil 5 is extremely small. The light-pervious layer 6 is formed to close the light-passing opening 55 of the coil 5. The light-pervious layer 6 also has a small thickness correspondingly to the coil 5.

The substrate 8 is made, for example, of a transparent glass material which is similar or identical in light refraction index to the glass material for the second object lens 4. Before bonding, the upper surface of the substrate 8 and the lower lens surface 40b of the second object lens 4 are finely polished with high precision to have highly smooth surfaces for intimate contact. If the two surfaces are polished to be perfectly planar, they can be intimately bonded to each other by utilizing intermolecular attraction, thereby establishing optical contact. However, such bonding is not limitative, so that the substrate 8 may be bonded to the lens surface 40b by utilizing a light-transmitting adhesive for example.

The substrate 8 is provided with a pair of electrodes 7B. Each of the paired electrodes 7B penetrates through the substrate 8 in its thickness direction, and has an upper end projecting above the upper surface of the substrate 8. Each electrode 7B further has a lower end surface 70b which is substantially flush with the lower surface of the substrate 8.

The lower surface of the substrate 8 is further formed with a coil 5 which has a pair of lead wirings 51. Each of the lead wirings 51 includes an end 51b in electrical contact with the lower end surface 70b of a respective electrode 7B. Therefore, electric power can be supplied to the coil 5 from above the substrate 8 through an external wiring (not shown) connected to the upper projecting end of the respective electrode 7B. Thus, there is no need for providing bulky wirings in the gap between the substrate 8 and the magneto-optical disk D, so that the gap can be kept very small.

In manufacture, the substrate 8 is first processed to incorporate the coil 5 and the light-pervious layer 6, and the thus processed substrate 8 is then bonded to the second object lens 4. Since the substrate 8 having the coil 5 and the light-pervious layer 6 can be prepared by a mass production process which is separate from the production process for the second object lens 4, the production efficiency can be enhanced in comparison with the case in which the coil 5 and the light-pervious layer 6 are formed directly on each of numerous second object lenses 4. Further, since the coil 5 is formed on the lower surface of the substrate 8 which is diametrically larger than the second object lens 4, the coil 5 can be made to have an increased number of turns for generating a stronger magnetic field than if the coil 5 is formed directly on the second object lens 4.

According to the seventh embodiment, a laser beam entering the second object lens 4 passes through the substrate 8 and the light-pervious layer 6 before reaching the magneto-optical disk D. However, since the second object lens 4, the substrate 8 and the light-pervious layer 6 are equal or substantially equal to each other in refractive index, the laser beam is not refracted at the boundaries between them. Instead, the laser beam is refracted greatly only when the laser beam propagates into the air gap between the disk D and the light-pervious layer 6. Therefore, the same advantages as those described with reference to FIGS. 6a and 6b are obtainable.

Figure 14:
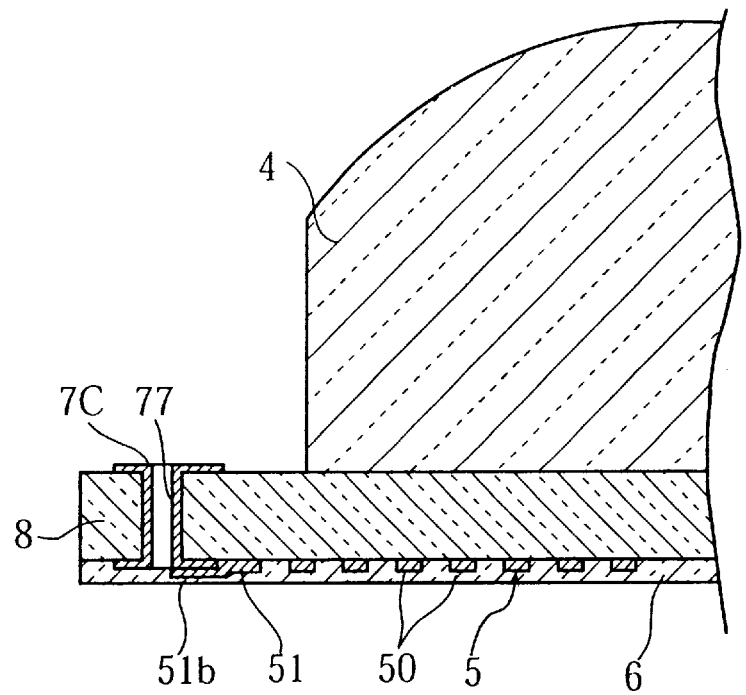
FIG. 14 is a fragmentary sectional view showing an optical head according to an eighth embodiment of the present invention.

An eighth embodiment shown in FIG. 14 is similar to the seventh embodiment of FIGS. 12 and 13 but differs therefrom in that a substrate 8 is formed with through-holes 77 (only one shown) each of which is loaded with a film electrode 7C. The film electrode 7C extends out of the respective through-hole 77 onto the lower surface of the substrate 8 into electrical connection with a coil 5. Further, the film electrode 7C also extends onto the upper surface of the substrate 8 for connection to an external wiring (not shown) from above.

Figure 15:
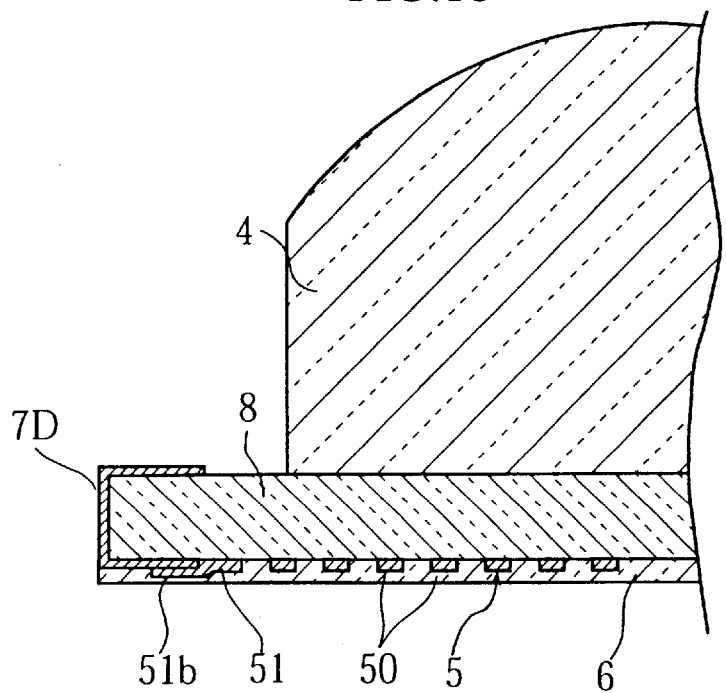
FIG. 15 is a fragmentary sectional view showing an optical head according to a ninth embodiment of the present invention.

A ninth embodiment shown in FIG. 15 is also similar to the seventh embodiment of FIGS. 12 and 13 but differs therefrom in that a side edge of a substrate 8 is formed with film electrodes 7D (only one shown). Each of the film electrodes 7D extends onto the lower surface of the substrate 8 into electrical connection with a coil 5. Further, the film electrode 7D also extends onto the upper surface of the substrate 8 for connection to an external wiring (not shown) from above.

In either of the seventh to ninth embodiments shown in FIGS. 12–15, the substrate 8 may perform an additional function as a slider. In such a case, therefore, the substrate 8 is used for connection to a suspension arm (see the element Sa in FIG. 1).

Figure 16:
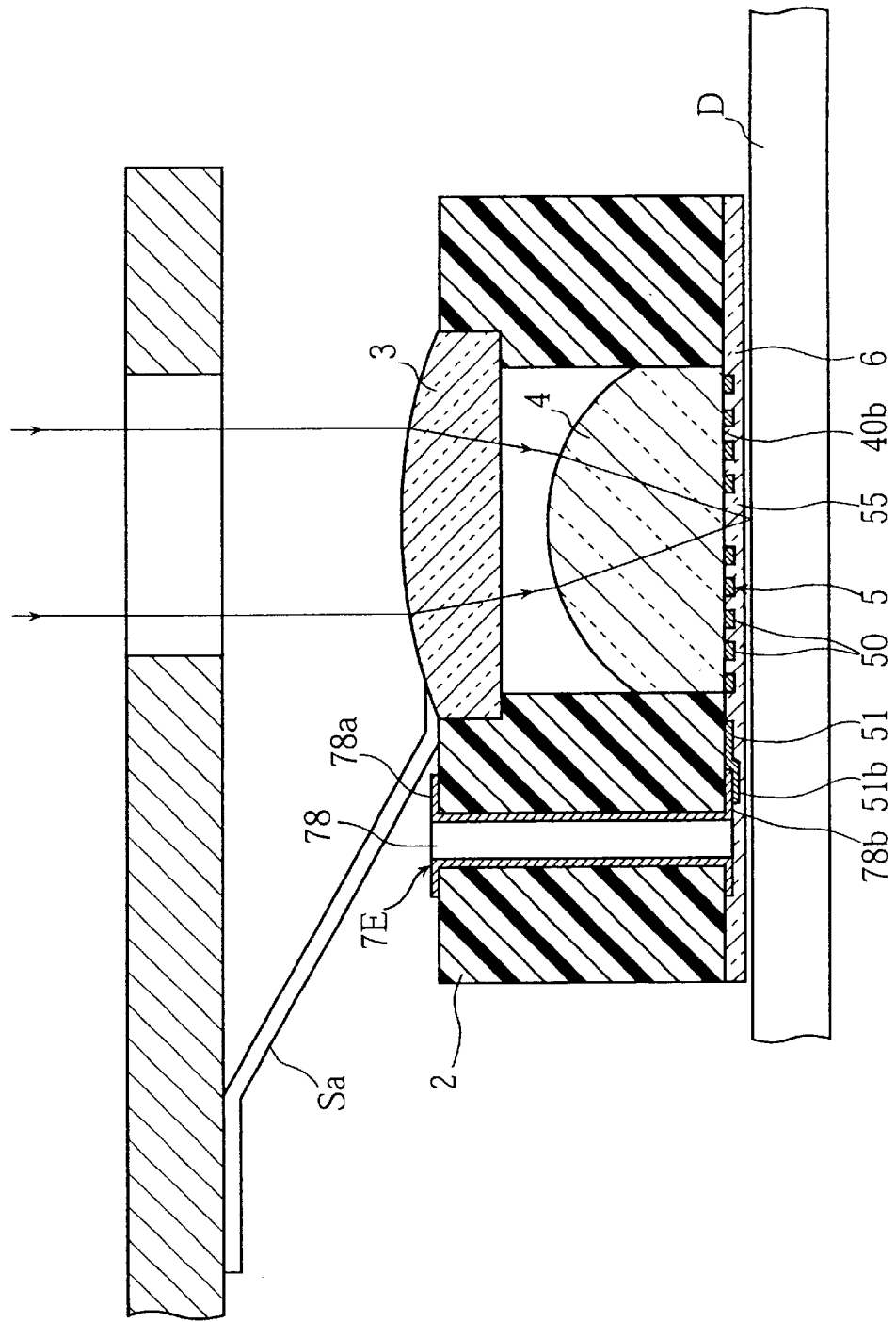
FIG. 16 is a sectional view showing an optical head according to a tenth embodiment of the present invention.
Figure 17:
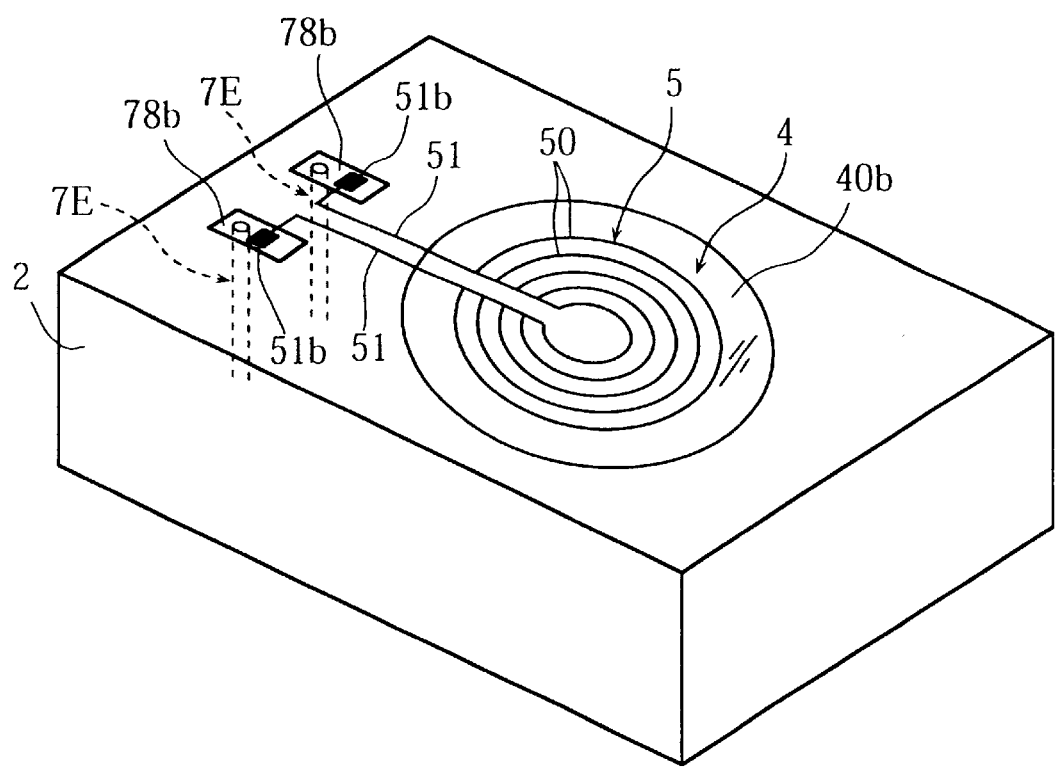
FIG. 17 is a perspective view showing the optical head of FIG. 16 in an inverted state.

FIGS. 16 and 17 show a magneto-optical recording/reproducing apparatus according to a tenth embodiment of the present invention. In this embodiment, a slider 2 is formed with through-holes 78 each of which is loaded with a film electrode 7E. The film electrode 7C extends out of the respective through-hole 78 onto the upper and lower surfaces of the slider 2 to provide electrode pads 78a, 78b, respectively. A coil 5 is formed on the lower lens surface 40b of a second object lens 4, and has a pair of lead wirings 51 extending onto the lower surface of the slider 2. Each of the lead wirings 51 has an end 51b held in electrical contact with a respective electrode pad 78b on the lower surface of the slider 2. The electrode pads 78a on the upper surface of the slider 2 are used for connection to external wirings (not shown) from above. A light-pervious layer 6 is formed on the lower surface of the slider 2 and on the lens surface 40b for covering the entire coil 5.

In this way, the slider 2 itself may be provided with the electrodes 7E for supplying electric power from above. The electrodes 7E on the slider 2 may take such a configuration as shown in FIG. 12 or 15.

Figure 18:
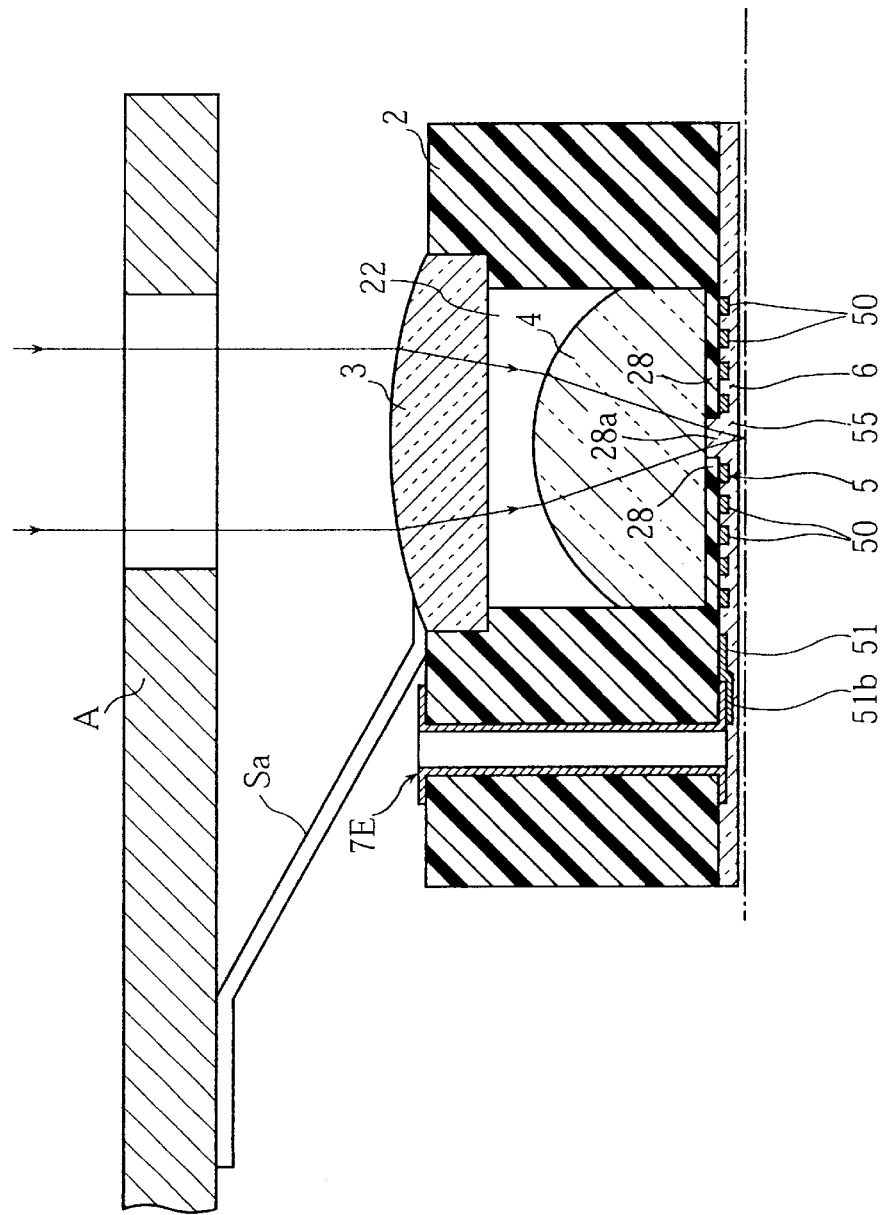
FIG. 18 is a sectional view showing an optical head according to an eleventh embodiment of the present invention.

In the eleventh embodiment shown in FIG. 18, a slider 2 has a support wall 28 at the bottom of a hole 22 for receiving a second object lens 4, and a coil 5 is formed on the lower surface of the support wall 28. A light-passing hole 28a is formed centrally of the supporting part 28 for allowing passage of a laser beam, and a light-pervious layer 6 is formed on the lower surface of the slider 2 to close the light-passing hole 28a and a light-passing opening 55 of the coil 5 with a transparent material. In this way, the coil 5 may be formed on a portion of the slider 2 per se. Alternatively, the coil 5 may be formed on an opaque element (other than the slider 2) which is then attached to the slider 2.

According to the present invention, in summary, the coil is very thin and can be positioned very close to the magneto-optical disk. Thus, in operation where the slider floats from the disk in the μm order or in the sub-μm order, the minimum diameter of the coil can be rendered very small for generating a sufficiently strong magnetic field at the laser spot with a low power input. Further, the laser beam enters the air gap only after passing through the light-pervious layer which closes the light-passing opening of the coil and is held very close to the disk. Therefore, the path in which the laser beam projects toward the disk at a large angle can be rendered shorter than conventionally possible, thereby facilitating focusing of object lens.

The foregoing embodiments are not limitative on the scope of the present invention, and various modifications of each individual element are possible.

For instance, the slider 2 (see FIG. 1) need not be moved by the linear actuator Ac but instead may be driven by a two-dimensional actuator. Further, the slider 2 may be replaced by a holder which is always held slightly spaced from the disk D and moved by a linear actuator or a two-dimensional actuator. However, the use of a slider having a high floating stability is preferred in that it obviates the need for providing a focus servo detecting system and for directing a part of reflected light from the disk to the focus servo detecting system, thereby making it possible to increase the amount of light sent to the magneto-optical signal detecting system for reducing the proportion of noises contained in the signals.

According to any of the illustrated embodiments, the optical head H (see FIG. 1) is disposed above the magneto-optical disk D for writing and reading from above. However, the optical head may be disposed below the disk for writing and reading from below.

In the foregoing embodiments, the two object lenses 3, 4 (see FIG. 2 for example) are arranged in series for increasing the numerical aperture of the optical system. However, the present invention is also applicable where only a single object lens is arranged adjacent to the disk.

Further, though the light-pervious layer 6 (see FIG. 3 for example) is preferably made of a light-transmitting material which is equal or substantially equal in refractive index to the object lens 4, such a requirement is not essential for the present invention. Thus, the light-pervious layer may be made of transparent synthetic resin which differs in refractive index from a glass material.

The present invention being thus described, it is obvious that the same may be varied in many other ways. Such variations are not to be regarded as a departure from the spirit and scope of the invention, and all such variations as would be obvious to those skilled in the art are intended to be covered by the appended claims.

What is claimed is:

1. An optical head comprising:
a lens carrier movable at least radially of a magneto-optical disk in facing relation thereto;
an object lens mounted on the lens carrier to converge a laser beam for forming a laser spot on the disk, the object lens having an optical axis and including a substantially flat lens surface directed toward the disk;
a patterned coil formed on the lens surface at least in one layer, the coil having a light-passing opening corresponding to the optical axis of the object lens; and
a light-pervious layer formed on the lens surface for enclosing the coil;
wherein the light-passing opening of the coil is closed by a material that forms the light-pervious layer.

2. The optical head according to claim 1, wherein the light-pervious layer is equal or substantially equal in refractive index to the object lens.

3. The optical head according to claim 1, wherein the light-pervious layer entirely covers the coil.

4. The optical head according to claim 1, wherein the object lens has an opposite pair of side surfaces each of which is provided with an electrode in electrical connection to the coil.

5. The optical head according to claim 4, wherein the electrode has an end surface flush with the lens surface, the coil extending onto the end surface of the electrode in electrical contact therewith.

6. The optical head according to claim 4, wherein the electrode comprises a conductor film extending from a respective one of the side surfaces of the object lens to the lens surface into electrical contact with the coil.

7. The optical head according to claim 1, wherein the object lens has a side surface which is provided with a pair of electrodes in electrical connection to the coil.

8. The optical head according to claim 1, wherein the lens carrier has a surface flush with the lens surface, the light-pervious layer extending onto said surface of the lens carrier.

9. The optical head according to claim 8, wherein the lens carrier is provided with a pair of electrodes each extending onto said surface of the lens carrier for electrical contact with the coil.

10. The optical head according to claim 1, further comprising an additional object lens mounted on the lens carrier at a side away from the disk.

11. The optical head according to claim 1, wherein the lens carrier comprises a slider elastically supported to float slightly from the disk in rotation.

12. An optical head comprising:
a lens carrier movable at least radially of a magneto-optical disk in facing relation thereto;
an object lens mounted on the lens carrier to converge a laser beam for forming a laser spot on the disk, the object lens having an optical axis and including a substantially flat lens surface directed toward the disk;
a light-pervious substrate having a first surface bonded to the lens surface and a second surface directed toward the disk;
a patterned coil formed on the second surface of the substrate at least in one layer, the coil having a light-passing opening corresponding to the optical axis of the object lens; and
a light-pervious layer formed on the second surface of the substrate for enclosing the coil;
wherein the light-passing opening of the coil is closed by a material that forms the light-pervious layer.

13. The optical head according to claim 12, wherein the substrate and the light-pervious layer are equal or substantially equal in refractive index to the object lens.

14. The optical head according to claim 12, wherein the light-pervious layer entirely covers the coil.

15. The optical head according to claim 12, wherein the substrate is provided with a pair of electrodes in electrical connection to the coil.

16. The optical head according to claim 15, wherein each of the electrodes has an end surface flush with the second surface of the substrate, the coil extending onto the end surface of the electrode in electrical contact therewith.

17. The optical head according to claim 15, wherein each of the electrodes penetrates through the substrate.

18. The optical head according to claim 15, wherein each of the electrodes comprises a conductor film extending from a side edge of the substrate to the second surface thereof into electrical contact with the coil.

19. The optical head according to claim 12, further comprising an additional object lens mounted on the lens carrier at a side away from the disk.

20. The optical head according to claim 12, wherein the lens carrier comprises a slider elastically supported to float slightly from the disk in rotation.

21. An optical head comprising:
a lens carrier movable at least radially of a magneto-optical disk in facing relation thereto, the lens carrier including a support wall having a surface directed toward the disk, the support wall being formed with a light-passing hole;
an object lens mounted on the support wall of the lens carrier inside thereof to converge a laser beam for forming a laser spot on the disk, the object lens having an optical axis in alignment with the light-passing hole of the support wall and a substantially flat lens surface directed toward the disk;

a patterned coil formed on said surface of the support wall at least in one layer, the coil having a light-passing opening corresponding to the optical axis of the object lens; and a light-pervious layer formed on said surface of the support wall for enclosing the coil;

wherein the light-passing opening of the support wall and the light-passing opening of the coil are closed by a material that forms the light-pervious layer.

22. The optical head according to claim 21, wherein the light-pervious layer is equal or substantially equal in refractive index to the object lens.

23. The optical head according to claim 21, wherein the light-pervious layer entirely covers the coil.

24. The optical head according to claim 21, wherein the lens carrier is provided with a pair of electrodes in electrical connection to the coil.

25. The optical head according to claim 24, wherein each of the electrodes penetrates through the lens carrier.

26. The optical head according to claim 21, further comprising an additional object lens mounted on the lens carrier at a side away from the disk.

27. The optical head according to claim 21, wherein the lens carrier comprises a slider elastically supported to float slightly from the disk in rotation.

28. An optical head comprising:

a leans carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a patterned coil formed on the lens surface at least in one layer, the coil having a light-passing opening corresponding to the optical axis of the object lens; and a light-pervious layer formed on the lens surface for closing the light-passing opening of the coil;

wherein the object lens has an opposite pair of side surfaces each of which is provided with an electrode in electrical connection to the coil.

29. The optical head according to claim 28, wherein the electrode has an end surface flush with the lens surface, the coil extending onto the end surface of the electrode in electrical contact therewith.

30. The optical head according to claim 28, wherein the electrode comprises a conductor film extending from a respective one of the side surfaces of the object lens to the lens surface into electrical contact with the coil.

31. An optical head comprising:

a lens carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a patterned coil formed on the lens surface at least in one layer, the coil having a light-passing opening corresponding to the optical axis of the object lens; and a light-pervious layer formed on the lens surface for closing the light-passing opening of the coil;

wherein the object lens has a side surface which is provided with a pair of electrodes in electrical connection to the coil.

32. An optical head comprising:

a lens carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a patterned coil formed on the lens surface at least in one layer, the coil having a light-passing opening corresponding to the optical axis of the object lens; and a light-pervious layer formed on the lens surface for closing the light-passing opening of the coil;

wherein the lens carrier has a surface flush with the lens surface, the light-pervious layer extending onto said surface of the lens carrier; and wherein the lens carrier is provided with a pair of electrodes each extending onto said surface of the lens carrier for electrical contact with the soil.

33. An optical head comprising:

a lens carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a light-pervious substrate having a first surface bonded to the lens surface and a second surface directed toward the disk;

a patterned coil formed on the second surface of the substrate at least in one layer, the coil having a light-passing opening corresponding to the optical axis of the object lens; and a light-pervious layer formed on the second surface of the substrate for closing the light-passing opening of the coil;

wherein the substrate is provided with a pair of electrodes in electrical connection to the coil; and wherein each of the electrodes has an end surface flush with the second surface of the substrate, the coil extending onto the end surface of the electrode in electrical contact therewith.

34. An optical head comprising:

a lens carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a light-pervious substrate having a first surface bonded to the lens surface and a second surface directed toward the disk;

a patterned coil formed on the second surface of the substrate at least in one layer, the coil having a light-passing opening corresponding to the optical axis of the object lens; and a light-pervious layer formed on the second surface of the substrate for closing the light-passing opening of the coil;

wherein the substrate is provided with a pair of electrodes in electrical connection to the coil; and wherein each of the electrodes penetrates through the substrate.

35. A optical head comprising:

a lens carrier movable at least radially of a magneto-optical disk in facing relation thereto;

an object lens mounted on the lens carrier to converge a laser beam for forming a laser spot on the disk, the object lens having an optical axis and including a lens surface directed toward the disk;

a light-pervious substrate having a first surface bonded to the lens surface and a second surface directed toward the disk;

a patterned coil formed on the second surface of the substrate at least in one layer, the coil having a light-passing opening corresponding to the optical axis of the object lens; and a light-pervious layer formed on the second surface of the substrate for closing the light-passing opening of the coil;

wherein the substrate is provided with a pair of electrodes in electrical connection to the coil; and wherein each of the electrodes comprises a conductor film extending from a side edge of the substrate to the second surface thereof into electrical contact with the coil.

36. An optical head comprising:

a leans carrier movable at least radially of a magneto-optical disk in facing relation thereto, the lens carrier including a support wall having a surface directed toward the disk, the support wall being formed with a light-passing hole;

an object lens mounted on the support wall of the lens carrier inside thereof to converge a laser beam for forming a laser spot on the disk, the object lens having an optical axis in alignment with the light-passing hole of the support wall;

a patterned coil formed on said surface of the support wall at least in one layer, the coil having a light-passing opening corresponding to the optical axis of the object lens; and a light-pervious layer formed on said surface of the support wall for closing the light-passing hole of the support wall and the light-passing opening of the coil;

wherein the lens carrier is provided with a pair of electrodes in electrical connection to the coil; and wherein each of the electrodes penetrates through the lens carrier.

\* \* \* \* \*